US010533287B2

(12) United States Patent
Hayakawa et al.

(10) Patent No.: US 10,533,287 B2
(45) Date of Patent: Jan. 14, 2020

(54) DISPERSANT FOR CARBON FIBERS, CARBON FIBER DISPERSION COMPOSITION, AND METHOD FOR MANUFACTURING CARBON FIBER SHEET

(71) Applicant: KURARAY CO., LTD., Kurashiki-shi (JP)

(72) Inventors: Tomohiro Hayakawa, Kurashiki (JP); Toshimichi Kusunoki, Kurashiki (JP); Hiroyuki Kawai, Kurashiki (JP); Hideo Kiyoyama, Kyoto (JP)

(73) Assignee: KURARAY CO., LTD., Kurashiki-shi (JP)

( * ) Notice: Subject to any disclaimer, the term of this patent is extended or adjusted under 35 U.S.C. 154(b) by 81 days.

(21) Appl. No.: 15/763,486

(22) PCT Filed: Sep. 27, 2016

(86) PCT No.: PCT/JP2016/078515
§ 371 (c)(1),
(2) Date: Mar. 27, 2018

(87) PCT Pub. No.: WO2017/057393
PCT Pub. Date: Apr. 6, 2017

(65) Prior Publication Data
US 2018/0313037 A1 Nov. 1, 2018

(30) Foreign Application Priority Data

Sep. 29, 2015 (JP) ................. 2015-192108

(51) Int. Cl.
| | | |
|---|---|---|
| *D21H 21/08* | (2006.01) | |
| *C08L 63/00* | (2006.01) | |
| *C08L 75/08* | (2006.01) | |
| *B01F 17/00* | (2006.01) | |
| *D21H 13/50* | (2006.01) | |
| *D21H 17/00* | (2006.01) | |
| *D21H 17/52* | (2006.01) | |
| *D21H 17/57* | (2006.01) | |

(52) U.S. Cl.
CPC .......... *D21H 21/08* (2013.01); *B01F 17/005* (2013.01); *B01F 17/0028* (2013.01); *B01F 17/0092* (2013.01); *C08L 63/00* (2013.01); *C08L 75/08* (2013.01); *D21H 13/50* (2013.01); *D21H 17/52* (2013.01); *D21H 17/57* (2013.01); *D21H 17/72* (2013.01)

(58) Field of Classification Search
None
See application file for complete search history.

(56) References Cited

U.S. PATENT DOCUMENTS

| | | | |
|---|---|---|---|
| 7,446,233 B1 * | 11/2008 | Miyanaga | ............... C08G 65/22 523/212 |
| 2002/0142014 A1 | 10/2002 | Afriat et al. | |
| 2011/0257326 A1 | 10/2011 | Jaunky et al. | |
| 2012/0160128 A1 | 6/2012 | Kobayashi et al. | |
| 2017/0080397 A1 | 3/2017 | Ishigure et al. | |

FOREIGN PATENT DOCUMENTS

| | | | |
|---|---|---|---|
| CN | 1319118 A | * | 10/2001 |
| CN | 1357309 A | | 7/2002 |
| EP | 1 160 279 A1 | | 12/2001 |
| JP | 2-150463 A | | 6/1990 |
| JP | 6-116893 A | | 4/1994 |
| JP | 11-193304 A | | 7/1999 |
| JP | 2005-200280 A | | 7/2005 |
| JP | 2005-320220 A | | 11/2005 |
| JP | 2008-247968 A | | 10/2008 |
| JP | 2008-248412 A | | 10/2008 |
| JP | 2010-13312 A | | 1/2010 |
| JP | 2010-119949 A | | 6/2010 |
| JP | 2010-247099 A | | 11/2010 |
| JP | 2012-149170 A | | 8/2012 |
| JP | 2012-166154 A | | 9/2012 |
| JP | 2014-205088 A | | 10/2014 |
| JP | 2016-169309 A | | 9/2016 |
| WO | 2011/024800 A1 | | 3/2011 |
| WO | 2016/039218 A1 | | 3/2016 |

OTHER PUBLICATIONS

Extended European Search Report dated May 7, 2019 in corresponding European Patent Application No. 16851564.1, 6 pages.
International Preliminary Report on Patentability and Written Opinion dated Apr. 12, 2018 in PCT/JP2016/078515 (English Translation only).
International Search Report dated Nov. 22, 2016 in PCT/JP2016/078515 filed Sep. 27, 2016.
Office and Search Report dated Sep. 4, 2019, in Chinese Patent Application No. 201680056501.9 filed Sep. 27, 2016 (with English translation).

* cited by examiner

*Primary Examiner* — Dennis R Cordray
(74) *Attorney, Agent, or Firm* — Oblon, McClelland, Maier & Neustadt, L.L.P.

(57) ABSTRACT

Provided is a dispersant for carbon fibers which allows uniform dispersion of relatively long carbon fibers, e.g., carbon fibers with a length of 12.5 mm or more, particularly 10.0-100.0 mm, more particularly 12.5-50.0 mm in an aqueous medium.
A dispersant for carbon fibers used by combining: (A) a random copolymer of phenylglycidyl ether and ethylene oxide, or a random copolymer of phenylglycidyl ether, ethylene oxide and propylene oxide; and (B) a polyether-based polyurethane resin based on a bifunctional polyol and hexamethylene diisocyanate, the bifunctional polyol being polyethylene glycol and/or an ethylene oxide-propylene oxide random copolymer.

5 Claims, No Drawings

DISPERSANT FOR CARBON FIBERS, CARBON FIBER DISPERSION COMPOSITION, AND METHOD FOR MANUFACTURING CARBON FIBER SHEET

TECHNICAL FIELD

The present invention relates to a dispersant for carbon fibers, a carbon fiber dispersion composition comprising the dispersant for carbon fibers, and a method for manufacturing a carbon fiber sheet from the carbon fiber dispersion composition.

BACKGROUND ART

Carbon fibers have superior properties such as high mechanical characteristics, chemical resistance, electrical conductivity and thermal conductivity. Therefore, they are widely used in the fields of airplanes, automobiles, leisure goods and the like for the purpose of improving mechanical strength, as well as in the fields of components of electronic equipment and the like for the purpose of imparting electrical conductivity and thermal conductivity.

In order to manufacture the mechanical and functional composite materials described above by use of carbon fibers, it is required that carbon fibers be uniformly dispersed in a solution, a resin solution and a resin. However, since carbon fibers generally have a high cohesive force, they are materials which are hardly uniformly dispersed and so it is desired to provide a method and a dispersant which enable more uniform dispersion.

As a method for uniformly dispersing carbon fibers, carbon nanofibers and the like in an aqueous medium, there are known a method in which a gelatinous dispersion liquid is prepared by adding borax to an aqueous solution of polyvinyl alcohol, and carbon nanofibers are added to this dispersion liquid, followed by stirring (Patent Document 1), and the like.

As a dispersant for uniformly dispersing carbon fibers, carbon nanofibers and the like in an aqueous medium or a non-aqueous medium, the following dispersants are known which are added for improving dispersibility of carbon fibers when carbon fibers are dispersed in an organic solvent solution of an organic solvent-soluble resin: a dispersant for carbon fibers represented by the following general formula (1):

[Chemical Formula 1]

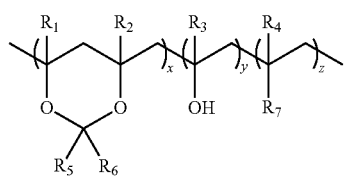

General Formula (1)

wherein $R_1$, $R_2$, $R_3$ and $R_4$ each independently represent a hydrogen atom, a hydroxyl group, an unsubstituted or substituted $C_{1-30}$ alkyl group, an unsubstituted or substituted hydroxyalkyl group, an alkyloxy group, an acyloxy group, a carboxyl group, an acyl group, primary to tertiary amino groups, an unsubstituted or substituted aryl group, an unsubstituted or substituted aryloxy group or an unsubstituted or substituted heterocyclic group, $R_5$ and $R_6$ each independently represent a hydrogen atom, an unsubstituted or substituted $C_{1-30}$ alkyl group, an unsubstituted or substituted aryl group or an unsubstituted or substituted heterocyclic group or $R_5$ and $R_6$ may be combined to form a ring, $R_7$ represents a hydrogen atom, an unsubstituted or substituted $C_{1-30}$ alkyl group, an unsubstituted or substituted hydroxyalkyl group, an alkyloxy group, an acyloxy group, a carbonyl group, a carboxyl group, primary to tertiary amino groups, an unsubstituted or substituted aryl group, an unsubstituted or substituted aryloxy group or an unsubstituted or substituted heterocyclic group, and X:Y:Z=65 to 90:5 to 30:0 to 10 (Patent Document 2); and a dispersant for carbon fibers represented by the following general formula (1):

[Chemical Formula 2]

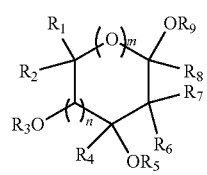

General Formula (1)

wherein $R_1$, $R_2$, $R_4$, $R_6$, $R_7$ and $R_8$ each independently represent a hydrogen atom, a hydroxyl group, an unsubstituted or substituted $C_{1-30}$ alkyl group, an unsubstituted or substituted hydroxyalkyl group, an alkyloxy group, an acyloxy group, a carboxyl group, an acyl group, primary to tertiary amino groups, an unsubstituted or substituted aryl group, an unsubstituted or substituted aryloxy group or an unsubstituted or substituted heterocyclic group, provided that a hydrogen atom when $R_6$ or $R_7$ is a hydroxyl group may be substituted with an unsubstituted or substituted heterocyclic group, $R_3$, $R_5$ and $R_9$ each independently represent a hydrogen atom, an unsubstituted or substituted $C_{1-30}$ alkyl group, an unsubstituted or substituted aryl group, an unsubstituted or substituted heterocyclic group, an unsubstituted or substituted pyranosyl group or an unsubstituted or substituted furanosyl group; or when they represent a group bonded via an oxygen atom, they may form a carbonyl group with elimination of its adjacent group, the group bonded to a different carbon may be linked together to form an olefin or a ring, the configuration of a substituent bonded to a chiral carbon may be either axial, equatorial or racemic, and when a glycosidic bond is formed, it may be either α or β; m represents 0 or 1, n represents an integer of from 0 to 2 (Patent Document 3).

Also, the following arts are known: a surfactant having an alkyl ester group, a vinylidene group and an anionic group (Patent Document 4); a dispersant used for carbon fillers which comprises hydroxyalkyl chitosan as a major ingredient (Patent Document 5); a dispersant for carbon material comprising a copolymer (A) which consists of a structural unit (a1) represented by the following formula (1) and a structural unit (a2) represented by the following formula (2):

[Chemical Formula 3]

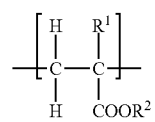

Formula (1)

-continued

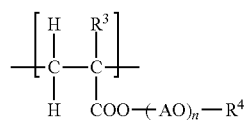

Formula (2)

wherein $R_1$ is a hydrogen atom or a methyl group, $R_2$ is a $C_{16\text{-}22}$ alkyl group, $R_3$ is a hydrogen atom or a methyl group, $R_4$ is a hydrogen atom or a $C_{1\text{-}22}$ alkyl group, AO is a $C_{2\text{-}4}$ oxyalkylene group, n is an integer of 1 to 100,
wherein the copolymer (A) has a mass ratio of (a1) to (a2), i.e., (a1)/(a2) of 90/10 to 10/90, and a weight-average molecular weight of 3,000 to 500,000 (Patent Document 6); and an aqueous dispersant which is a polyether-based compound represented by the following formula (1):

[Chemical Formula 4]

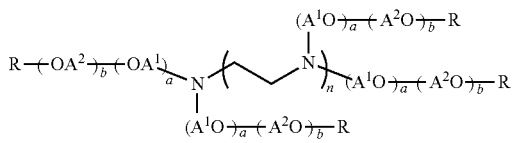

Formula (1)

wherein $A^1O$ is an oxyethylene group, a is 3 to 25, $A^2O$ is an oxypropylene group, b is 1 to 10, the conditions of 5≤a+b≤30 and 1≤a/b≤5 are satisfied, R is a hydrogen atom or a $C_{1\text{-}4}$ hydrocarbon group, n is 1 to 4, and having a molecular weight of 1000 to 5000 (Patent Document 7).

PRIOR ART DOCUMENTS

Patent Documents

Patent Document 1: JP 2005-200280 A
Patent Document 2: JP 2008-248412 A
Patent Document 3: JP 2008-247968 A
Patent Document 4: JP 2010-013312 A
Patent Document 5: WO 2011/024800 A1
Patent Document 6: JP 2012-166154 A
Patent Document 7: JP 2014-205088 A

SUMMARY OF THE INVENTION

Problem to be Solved by the Invention

However, even if the methods and dispersants disclosed in Patent Documents 1 to 7 are used, it was difficult to uniformly disperse relatively long carbon fibers, e.g., carbon fibers with a length of 12.5 mm or more, particularly 10.0-100.0 mm, more particularly 12.5-50.0 mm in an aqueous medium. In particular, it was more difficult to uniformly disperse them in an aqueous medium including water and/or a hydrophilic organic solvent because they have a low surface energy and poor wettability to the aqueous medium due to the fact that carbon fiber surfaces are oleophilic.

Therefore, objects of the present invention are to provide a dispersant for carbon fibers which allows uniform dispersion of relatively long carbon fibers, e.g., carbon fibers with a length of 12.5 mm or more, particularly 10.0-100.0 mm, more particularly 12.5-50.0 mm in an aqueous medium; and furthermore to obtain a carbon fiber sheet with a very good texture by subjecting a carbon fiber dispersion composition comprising such a dispersant for carbon fibers, carbon fibers and water to a papermaking and drying step.

Means for Solving the Problem

The present inventors intensively studied, and made a detailed study on dispersants for carbon fibers in order to solve the above problem, thus completing the present invention.

That is, the present invention includes the following preferred aspects.

[1] A dispersant for carbon fibers used by combining:
(A) a random copolymer of phenylglycidyl ether and ethylene oxide, or a random copolymer of phenylglycidyl ether, ethylene oxide and propylene oxide; and
(B) a polyether-based polyurethane resin based on a bifunctional polyol and hexamethylene diisocyanate, the bifunctional polyol being polyethylene glycol and/or an ethylene oxide-propylene oxide random copolymer.
[2] The dispersant for carbon fibers according to the above [1], wherein 20 to 500 parts by mass of the polyether-based polyurethane resin (B) are used based on 100 parts by mass of the random copolymer (A).
[3] A carbon fiber dispersion composition comprising the dispersant for carbon fibers according to the above [1] or [2], carbon fibers and water.
[4] The carbon fiber dispersion composition according to the above [3], comprising 2 to 30 parts by mass of the dispersant for carbon fibers based on 100 parts by mass of the carbon fibers.
[5] A method for manufacturing a carbon fiber sheet, comprising subjecting the carbon fiber dispersion composition according to the above [3] or [4] to a papermaking and drying step.

Effect of Invention

By the present invention, there is provided a dispersant for carbon fibers which allows uniform dispersion of relatively long carbon fibers, e.g., carbon fibers with a length of 12.5 mm or more, particularly 10.0-100.0 mm, more particularly 12.5-50.0 mm in an aqueous medium.

DESCRIPTION OF EMBODIMENTS

<Dispersant for Carbon Fibers>

A dispersant for carbon fibers of the present invention is used by combining:
(A) a random copolymer of phenylglycidyl ether and ethylene oxide, or a random copolymer of phenylglycidyl ether, ethylene oxide and propylene oxide; and
(B) a polyether-based polyurethane resin based on a bifunctional polyol and hexamethylene diisocyanate, the bifunctional polyol being polyethylene glycol and/or an ethylene oxide-propylene oxide random copolymer.

In the present invention, "used by combining" may be either "use of a mixture of the random copolymer (A) and the polyether-based polyurethane resin (B)", or "use of the random copolymer (A) and the polyether-based polyurethane resin (B) in any order".

The random copolymer (A) and the polyether based polyurethane resin (B) that are two components of the dispersant for carbon fibers of the present invention will hereinafter be specifically described.

<Random Copolymer (A)>

The random copolymer (A) is based on phenylglycidyl ether (PGE), ethylene oxide (50) and propylene oxide (PO), and has a structural unit represented by the following chemical formula:

[Chemical Formula 5]

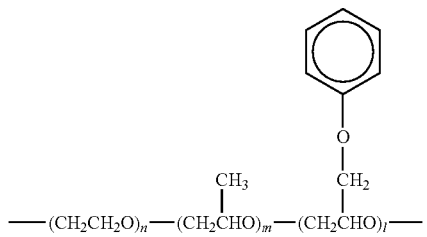

wherein l and n are integers of 1 or more; m is an integer of 0 or more; PGE, EO and PO are arranged with a random order.

l is an integer of 1 or more, and m is an integer of 0 or more. n is an integer of 1 or more, preferably 60 or more, and especially preferably 150 or more.

The copolymerization ratio EO:PGE is preferably 70:30 to 99.5:0.5, more preferably 80:20 to 99.5:0.5, and especially preferably 80:20 to 99:1. Furthermore, the copolymerization ratio of PO is preferably not more than 30, more preferably not more than 20, and especially preferably not more than 10.

Here, the copolymerization ratio EO:PGE is a mass ratio of ethylene oxide to phenylglycidyl ether in the random copolymer (A), and the copolymerization ratio of PO is a mass ratio of propylene oxide in the random copolymer (A), which can be measured by use of, for example, magnetic resonance spectrum ($^1$H-NMR) under the following measurement conditions.

<Measurement Conditions>
Equipment: Product Name "JNM-AL400" (manufactured by JEOL Ltd.)
Observed Nucleus: 1H
Observation Range: 7992.01 Hz
Data Point Number: 32768
Pulse Width: 5.80 μsec
Wait Time: 50.00 μsec
Integration Frequencies: 512
Measurement Temperature: 25° C.
Solvent for Measurement: Deuterated chloroform
Sample Concentration: 0.01 g/mL When the copolymerization ratio in the random copolymer (A) is within the above ranges, the effect of improving the dispersibility of the carbon fibers is well-exhibited easily.

The random copolymer (A) preferably has a larger weight-average molecular weight Mw from the viewpoint of dispersibility, for example, preferably 4,000 to 10,000,000, more preferably 4,000 to 1,000,000, and especially preferably 10,000 to 200,000.

The weight-average molecular weight Mw can be measured by use of, for example, gel permeation chromatography (GPC) under the following measurement conditions.
<Measurement Conditions>
Apparatus: Product Name "LC-10AD" (manufactured by Shimadzu Corporation)
Detector: Differential Refractive Index Detector (RID)
Column: Product Name "SHODEX KF-804" (manufactured by SHOWA DENKO K.K.)
Measurement Temperature: 30° C.
Eluent: THF
Flow Rate: 1.0 mL/min
Sample Concentration: 0.2% by mass (THF)
Sample Injection Volume: 100 μL
Conversion Standard: Polyethylene oxide When the weight-average molecular weight of the random copolymer (A) is within the above ranges, the effect of improving the dispersibility of the carbon fibers is well-exhibited easily.

The molecular weight distribution (weight-average molecular weight Mw/number-average molecular weight Mn) of the random copolymer (A) is not particularly limited, preferably not more than 5, more preferably not more than 3, and especially preferably not more than 2. Similarly to the measurement of the weight-average molecular weight Mw described above, the number-average molecular weight can be measured by use of gel permeation chromatography (GPO). When the molecular weight distribution of the random copolymer (A) is within the above ranges, it can have a viscosity that is easy to handle when it is used as an aqueous solution, for example, so that the effect of improving the dispersibility of the carbon fibers is easily and favorably brought about.

The degree of randomness of the random copolymer (A) is not particularly limited.
<Production of Random Copolymer (A)>

The random copolymer (A) can be produced by copolymerizing phenylglycidyl ether and ethylene oxide, or phenylglycidyl ether and ethylene oxide and propylene oxide, preferably in the above-described copolymerization ratio. The copolymerization of phenylglycidyl ether and ethylene oxide, or the copolymerization of phenylglycidyl ether and ethylene oxide and propylene oxide can be carried out by use of a publicly known method such as a solution polymerization method or a solvent slurry polymerization method. For example, it can be carried out as follows: under an inert gas atmosphere, to a solution obtained by adding an appropriate catalyst to an appropriate solvent at room temperature, predetermined amounts of phenylglycidyl ether and ethylene oxide, or predetermined amounts of phenylglycidyl ether and ethylene oxide and propylene oxide are added so as to copolymerize them. A common catalyst used for producing a random copolymer from glycidyl ether and an alkylene oxide can be used as an appropriate catalyst. Examples thereof can include, for example, an organic aluminum-based catalyst, an organic zinc-based catalyst, an organic tin-phosphate condensate catalyst, an alkali metal hydroxide catalyst or an alkoxide of an alkali metal such as potassium hydroxide or sodium hydroxide, and a catalyst composition obtained by combining them. Among them, it is preferred to use a catalyst composition comprising an organic aluminum-based catalyst in combination with an alkoxide of an alkali metal or an alkali metal hydroxide from the viewpoints of the catalytic activity level, ease of adjusting the polymerization degree, and ease of handling. A common solvent used for producing a random copolymer from glycidyl ether and an alkylene oxide can be used as an appropriate solvent. Examples thereof can include, for example, ethers, aliphatic hydrocarbons, aromatic hydrocarbons, halogen-based solvents, ketones and the like, and a mixture of two or more of these solvents. Among them, it is preferred to use n-butane, isobutane, n-pentane, cyclopentane, industrial hexane, n-hexane, isohexane, cyclohexane, n-heptane, n-octane or isooctane from the viewpoint that the random copolymer produced is easily dried and can be handled as powders without any aggregation because it is not dissolved in a solvent. Furthermore, it is preferred to use toluene or xylene from the viewpoint that the random copolymer produced can be handled as a solution because it is dissolved in the solvent. The reaction temperature (copolymerization temperature) at which the copolymerization is carried out is not particularly limited as long as it is a typical temperature. For example, it may be not more than 150° C., preferably not more than 50° C. After the copolymerization reaction, the reaction solution is filtrated or concentrated, and the residue is dried by a typical method (e.g., by use of a vacuum drier), so that a random copolymer (A) can be obtained as a viscous liquid or a solid.

A commercially available phenylglycidyl ether-ethylene oxide-propylene oxide random copolymer can also be used as the random copolymer (A). Examples thereof can include ALKOX (registered trade name) CP-B1, CP-B2 and the like manufactured by Meisei Chemical Works, Ltd.

<Polyether-Based Polyurethane Resin (B)>

A polyether-based polyurethane resin (B) is based on a bifunctional polyol and hexamethylene diisocyanate, the bifunctional polyol being polyethylene glycol and/or an ethylene oxide-propylene oxide random copolymer.

The polymerization ratio (bifunctional polyol:hexamethylene diisocyanate) is preferably 99.5:0.5 to 60:40, more preferably 99.5:0.5 to 80:20, and especially preferably 99:1 to 95:5. Here, the polymerization ratio (bifunctional polyol: hexamethylene diisocyanate) is a mass ratio of the bifunctional polyol to the hexamethylene diisocyanate in the polyether-based polyurethane resin (B), which can be measured by use of, for example, magnetic resonance spectrum ($^1$H-NMR) as described previously. When the polymerization ratio in the polyether-based polyurethane resin (B) is within the above ranges, water solubility of the polyether-based polyurethane resin (B) is improved, and wettability to the carbon fibers is improved, so that the effect of improving the dispersibility of the carbon fibers is well-exhibited easily.

The polyether-based polyurethane resin (B) has a weight-average molecular weight Mw of preferably 5,000 to 1,000,000, more preferably 10,000 to 1,000,000, and especially preferably 20,000 to 100,000. The weight-average molecular weight Mw can be measured by use of, for example, gel permeation chromatography (GPC) as described previously. When the weight-average molecular weight of the polyether-based polyurethane resin (B) is within the above ranges, the effect of improving the dispersibility of the carbon fibers is well-exhibited easily.

The molecular weight distribution (Mw/Mn) of the polyether-based polyurethane resin (B) is not particularly limited.

<Production of Polyether-Type Polyurethane Resin (B)>

The polyether-based polyurethane resin (B) can be produced by polymerizing bifunctional polyol being polyethylene glycol and/or an ethylene oxide-propylene oxide random copolymer with hexamethylene diisocyanate preferably in the above-described polymerization ratio.

<Polyethylene Glycol>

Polyethylene glycol that is one of the bifunctional polyols for producing the polyether-based polyurethane resin (B) preferably has a weight-average molecular weight Mw of 200 to 300,000, more preferably 400 to 200,000, and especially preferably 400 to 20,000. The weight-average molecular weight Mw can be measured by use of, for example, gel permeation chromatography (GPC) as described previously. When the weight-average molecular weight of polyethylene glycol is within the above ranges, water solubility of the polyether-based polyurethane resin (B) is improved, and wettability to the carbon fibers is improved, so that the effect of improving the dispersibility of the carbon fibers is well-exhibited easily.

The molecular weight distribution (Mw/Mn) of the polyethylene glycol is not particularly limited.

Such polyethylene glycols are commercially available under the trade name of "PEG series" from Sanyo Chemical Industries, Ltd. or under the trade name of "ALKOX Series" from Meisei Chemical Works, Ltd.

<Ethylene Oxide-Propylene Oxide Random Copolymer>

An ethylene oxide-propylene oxide random copolymer that is one of bifunctional polyols for producing the polyether-based polyurethane resin (B) is based on ethylene oxide (EO) and propylene oxide (PO).

The copolymerization ratio EO:PO is preferably 90:10 to 10:90. Here, the copolymerization ratio EO:PO is a mass ratio of ethylene oxide to propylene oxide in the ethylene oxide-propylene oxide random copolymer, which can be measured by use of, for example, magnetic resonance spectrum ($^1$H-NMR) as described previously. When the copolymerization ratio in the ethylene oxide-propylene oxide random copolymer is within the above range, the effect of improving the dispersibility of the carbon fibers is well-exhibited easily.

The ethylene oxide-propylene oxide random copolymer preferably has a weight-average molecular weight Mw of 200 to 150,000, more preferably 400 to 110,000, and especially preferably 400 to 20,000. The weight-average molecular weight Mw can be measured by use of, for example, gel permeation chromatography (GPC) as described previously. When the weight-average molecular weight of the ethylene oxide-propylene oxide random copolymer is within the above ranges, the effect of improving the dispersibility of the carbon fibers is well-exhibited easily.

The molecular weight distribution (Mw/Mn) of the ethylene oxide-propylene oxide random copolymer is not particularly limited.

The degree of randomness of the ethylene oxide-polypropylene oxide random copolymer is not particularly limited.

The ethylene oxide-propylene oxide random copolymer can be produced by copolymerizing ethylene oxide and propylene oxide preferably in the above-described copolymerization ratio. The copolymerization of ethylene oxide and propylene oxide can be carried out by use of a publicly known method disclosed in JP H7-243178 A, JP 2011-32398 A or the like. For example, it can be carried out by addition-polymerizing ethylene oxide and propylene oxide to a diol compound. Ethylene glycol, propylene glycol, butane diol, hexamethylene glycol, hexylene glycol and the like can be used as the diol compound. A common catalyst used for producing a random copolymer from ethylene oxide and propylene oxide can be used as an appropriate catalyst. Examples thereof can include, for example, a hydroxide of an alkali metal, an alcoholate of an alkali metal and the like. Among them, it is preferred to use sodium hydroxide and potassium hydroxide from the perspective of ease of handling. The amount of the catalyst used is usually 0.01 to 1% by mass, preferably 0.05 to 0.5% by mass, more preferably 0.1 to 0.3% by mass based on the ethylene oxide-propylene oxide random copolymer. A common solvent used for producing a random copolymer from ethylene oxide and propylene oxide can be used as an appropriate solvent. For example, BTX such as toluene and xylene can be given. However, solvent-free synthesis is preferred from the viewpoint of production cost. The reaction temperature (copolymerization temperature) at which the copolymerization is carried out is not particularly limited if it is a typical temperature, and it may be, for example, 80 to 200° C. After the copolymerization reaction, unreacted monomers and a solvent are removed, and, if necessary, the catalyst is removed by a method such as adsorptive filtration, so that an ethylene oxide-propylene oxide random copolymer can be obtained as a liquid or a solid.

A commercially available ethylene oxide-propylene oxide random copolymer can also be used as the ethylene oxide-propylene oxide random copolymer. Examples thereof can include "New Pole (registered trade name) 75H-90000" manufactured by Sanyo Chemical Industries, Ltd., "Brownon P-13075R" manufactured by AOKI OIL INDUSTRIAL Co., Ltd. and the like.

The polymerization of a bifunctional polyol and hexamethylene diisocyanate for producing a polyether-based polyurethane resin (B) can be carried out by use of a publicly known method disclosed in JP H10-147706 A, JP 2001-354742 A, JP H7-243178 A or the like. For example, it can be carried by heating and dehydrating a bifunctional polyol under an inert gas atmosphere, and dissolving it in an appropriate solvent after cooling, followed by adding hexamethylene diisocyanate and an appropriate catalyst thereto to polymerize them. A typical catalyst used for producing a polyether-based polyurethane resin can be used as an appropriate catalyst. Examples thereof can include, for example, amine-based catalysts (triethylamine, dimethylcyclohexylamine, tetramethylethylenediamine, pentamethyldiethylenetriamine, triethylenediamine, N-methylmorpholine and the like), tin-based catalysts (dibutyltin dilaurate, trimethyltin laurate, trimethyltin hydroxide, dimethyltin dilaurate and the like), lead-based catalysts (lead oleate, lead 2-ethylhexanoate, lead naphthenate, lead octylate and the like). Among them, it is preferred to use dibutyltin dilaurate from the viewpoint of high catalytic activity. The amount of the catalyst used is usually 0.01 to 5 parts by mass, preferably 0.05 to 3 parts by mass, more preferably 0.1 to 1 part by mass, based on 100 parts by mass of the polyether-based polyurethane resin. A common solvent used for producing a polyether-based polyurethane resin can be used as an appropriate solvent. Examples thereof can include, for example, acetone, toluene, xylene, ethyl acetate, methyl ethyl ketone, methyl isobutyl ketone and the like. Among them, it is preferred to use acetone from the viewpoint of ease of removing the solvent. The reaction temperature (polymerization temperature) at which the polymerization is carried out is not particularly limited as long as it is a typical temperature. It may be, for example, 20 to 150° C., preferably 20 to 80° C. After the polymerization reaction, the solvent is removed by a typical method (e.g., distilled off), and replaced by water, so that an aqueous solution of the polyether-based polyurethane resin (B) can be obtained.

A commercially available polyether-based polyurethane resin can also be used as the polyether-based polyurethane resin (B). Examples thereof include Pulset HA manufactured by Meisei Chemical Works, Ltd., and the like.

Although the action mechanism of the dispersant for carbon fibers of the present invention is unknown, the following action mechanism can be inferred.

As the dispersant for carbon fibers of the present invention, combination of (A) a random copolymer of phenylglycidyl ether and ethylene oxide or (A) a random copolymer of phenylglycidyl ether, ethylene oxide and propylene oxide and (B) a specific polyether-based polyurethane resin is used. The random copolymer (A) contains a structural unit (phenyl glycidyl ether moieties) having an aryl group in a side chain, and a structural unit (ethylene oxide moieties and propylene oxide moieties) having no aryl group in a side chain. This can provide materials with excellent dispersibility, even if the materials have a lipophilic property and low surface energy like carbon fibers. Specifically, the structural unit (the phenyl glycidyl ether moieties) having an aryl group in a side chain produces the effect of interacting with a π-electron system on the surface of carbon fibers in a dispersion medium by π-π interaction specific to an aromatic ring, which is different from a hydrophobic interaction, due to the fact that the aryl group (aromatic ring) has an electron-rich π-electron system. By this, the random copolymer (A) produces non-covalent intermolecular interaction (adsorption action) with carbon fibers. Since the random copolymer (A) has a plurality of aromatic rings in a side chain, and thus can be adsorbed to the surface of the carbon fibers at multiple points, once it is adsorbed, it is hardly desorbed from the surface of the carbon fibers. On the other hand, it is considered that, as to the polyether-based polyurethane resin (B), since urethane resin itself has a high cohesive force, once it is mixed and inserted between the carbon fibers, it produces the effect of inhibiting aggregation between the carbon fibers.

The present invention also provides a dispersant for carbon fibers in which preferably 20 to 500 parts by mass of the polyether-based polyurethane resin (B), more preferably 25 to 400 parts by mass of the polyether-based polyurethane resin (B), especially preferably 50 to 250 parts by mass of the polyether-based polyurethane resin (B), even more preferably 70 to 200 parts by mass of the polyether-based polyurethane resin (B), and furthermore especially preferably 80 to 150 parts by mass of the polyether-based polyurethane resin (B) are used based on 100 parts by mass of the random copolymer (A). When the amount of the polyether-based polyurethane resin (B) with respect to the random copolymer (A) is within the above ranges, the effect of improving the dispersibility of the carbon fibers is well-exhibited easily.

<Carbon Fiber Dispersion Composition>

Furthermore, the present invention also relates a carbon fiber dispersion composition comprising the dispersant for carbon fibers of the present invention, carbon fibers and water.

<Carbon Fibers>

The carbon fibers are not particularly limited, and any of the known carbon fibers may be used. Examples thereof include polyacrylonitrile-based (PAN-based) carbon fibers, rayon-based carbon fibers, pitch-based carbon fibers and the like. The carbon fibers may be each used alone or in mixture of two or more kinds thereof. It is preferred to use PAN-based carbon fibers from the viewpoints of inexpensive cost and good mechanical characteristics. Such carbon fibers are available as commercial products.

The carbon fibers preferably have a diameter of 3 to 15 μm, and more preferably 5 to 10 μm.

Carbon fibers which are recycled from carbon fiber reinforced plastics (CFRP) or used carbon fiber nonwoven fabrics may be used as the carbon fibers. These carbon fibers may be also each used alone or in mixture of two or more kinds thereof. Since recycled carbon fibers are relatively inexpensive, they are preferred from a cost perspective. The recycling method for carbon fibers is not particularly limited. Examples thereof can include a method of removing a resin part from the CFRP by combustion, a method of removing a resin part by dissolving it in a solvent or decomposing it and the like. In the recycling of carbon fibers, it is difficult to obtain staples having a uniform fiber length, and very short fibers are mixed therein. In the present invention, very short fibers may be mixed in recycled carbon fibers in this manner to such an extent that the effect of the present invention is not impaired.

The carbon fibers usually have a length of 5 to 100 mm. In the present invention, the carbon fibers may be cut so that they have a length of for example 12.5 mm or more, especially 10.0 mm to 100.0 mm, and furthermore 12.5 mm to 50.0 mm, and then can be used.

Typical treatment for modifying a surface state of carbon fibers may be either performed or not performed on the carbon fibers. Examples thereof include, for example, application of an oil agent composition, introduction of a hydrophilic functional group by oxidation treatment, removal of an irregular surface fragile layer by application of high voltage and the like. Since the dispersant of the present invention is a dispersant suitable for carbon fibers themselves, the effect of improving the dispersibility of the carbon fibers may be potentially inhibited by the presence of a component other than the carbon fibers. In view of this, non-surface treated carbon fibers are preferred.

The carbon fiber dispersion composition of the present invention can be produced, for example, by putting a dispersant for carbon fibers, carbon fibers and water into a common mixer and the like, and stirring them (disintegrating the carbon fibers). The order of putting the dispersant for carbon fibers, the carbon fibers and the water is not particularly limited. The dispersant for carbon fibers may be put as a mixture of the random copolymer (A) and the ether-based polyurethane resin (B), or alternatively, the random copolymer (A) and the ether-based polyurethane resin (B) may be separately put in any order. Examples of the mixer and the like include various disintegrators (pulpers), various beaters such as Niagara beaters, various refiners such as single disc refiners and double disc refiners, various mixers and the like.

Not only usual tap water but also water such as distilled water and purified water can be used as the water of the dispersion medium. The dispersion medium may contain an aromatic hydrocarbon-based solvent, a hydrocarbon-based solvent, a halogenated hydrocarbon-based solvent, an ether-based solvent, a ketone-based solvent, an ester-based solvent, a glycol ether-based solvent, an acetate-based solvent, a dialkyl ether-based solvent, an alcohol-based solvent, a glycol-based solvent, a nitrile-based solvent, a carbonate-based solvent and the like. The above solvents may be contained alone or two or more of them may be contained.

In the present invention, the content of carbon fibers in the carbon fiber dispersion composition is preferably 0.01 to 1.0% by mass, and more preferably 0.03 to 0.5% by mass. When the content of the carbon fibers is within the above ranges, the carbon fibers are easily and efficiently dispersed.

Furthermore, the present invention also relates to a carbon fiber dispersion composition comprising, based on 100 parts by mass of carbon fibers, preferably 2 to 30 parts by mass of a dispersant for carbon fibers, more preferably 2.5 to 20 parts by mass of a dispersant for carbon fibers, and especially preferably 3 to 10 parts by mass of a dispersant for carbon fibers. When the amount of the dispersant for carbon fibers is within the above ranges, dispersion in water during papermaking is well-exhibited easily.

<Method for Manufacturing Carbon Fiber Sheet>

Furthermore, the present invention also relates to a method for manufacturing a carbon fiber sheet, comprising subjecting the carbon fiber dispersion composition to a papermaking and drying step.

By a so-called wet papermaking method in which a dispersion medium is removed from a carbon fiber dispersion composition to form a sheet, a carbon fiber sheet can be manufactured. The carbon fiber dispersion composition may be arbitrarily diluted with a medium as necessary before papermaking. A known paper machine such as an inclined wire paper machine, a cylinder paper machine, a Fourdrinier paper machine, or a Tanmo machine can be used as a paper machine used for the wet papermaking method.

When a carbon fiber sheet is manufactured by such a wet papermaking method, only with physical entanglement of fibers, the (wet paper) strength capable of handling as a sheet is sometimes insufficient. On that occasion, a binder may be added to bind the fibers together.

When the binder is added, the following steps are preferably included: internally adding a solution containing the binder or an emulsion containing the binder in a process of forming a carbon fiber sheet by the wet papermaking method, or, after forming a carbon fiber sheet, applying the binder to the carbon fiber sheet or impregnating the carbon fiber sheet with the binder; and heat-drying it. Those commonly used for manufacturing a nonwoven fabric can be used as such a binder. Examples thereof can include resins melted with hot water, such as an acrylic resin, a styrene-acrylic resin, an epoxy resin, a phenol resin, an urethane resin, a polyamide (nylon) resin, a polyester resin, a modified polyester resin (core-sheath structure), a polypropylene resin, a polyethylene resin, and a polyvinyl alcohol. Other fibers other than carbon fibers may be mixed therein.

The thickness of the thus obtained carbon fiber sheet can be adjusted to an appropriate thickness by drying it by use of a cylinder dryer, an air dryer or the like, and subsequently subjecting it to thermal pressing processing such as calendar roll treatment under heating.

The basis weight of the carbon fiber sheet is preferably 10 to 1,000 g/m$^2$, and more preferably 20 to 700 g/m$^2$. When the basis weight is within the above ranges, the deterioration in the operability of the paper machine, such as cutting of a carbon fiber sheet, is easily avoided, and, since the carbon fiber sheet can be dried within an appropriate time, the deterioration in the productivity is easily avoided, which is preferred.

In the present invention, the papermaking speed of a carbon fiber sheet is preferably 10 m/min or more. The upper limit of the taken-up speed is usually not more than 100 m/min. The drying temperature of the carbon fiber sheet by a cylinder dryer or the like is usually 100 to 200° C., preferably 100 to 150° C.

The carbon fiber sheet manufactured by the method for manufacturing a carbon fiber sheet according to the present invention has an extremely uniform texture. This demonstrates that the carbon fibers were extremely uniformly dispersed in the aqueous medium by the dispersant for carbon fibers of the present invention.

EXAMPLES

The present invention will further be specifically described by giving Examples and Comparative Examples. However, it should not be construed that the present invention is limited to these Examples.

<Measurement Method and Evaluation Method>

Various measurement methods and evaluation methods in Examples and Comparative Examples are as follows.

<Copolymerization Ratio>

As described above, the copolymerization ratio was measured by use of magnetic resonance spectrum ($^1$H-NMR).

<Weight-Average Molecular Weight Mw, Number-Average Molecular Weight Mn and Molecular Weight Distribution Mw/Mn>

The weight-average molecular weight Mw, the number-average molecular weight Mn and the molecular weight distribution Mw/Mn were measured by use of gel permeation chromatography (GPC) as described above.

<Evaluation of Texture of Carbon Fiber Sheet>

Uniformity of the texture of carbon fiber sheets was evaluated by 8 grades: <Extremely Uniform Texture>8, 7, 6, 5, 4, 3, 2, 1<Extremely Non-uniform Texture>, wherein those with extremely uniform texture and without any unevenness (bundles of fibers) were evaluated as 8 (good), whereas those with extremely non-uniform texture and the presence of unevenness (bundles of fibers) over the entire sheet were evaluated as 1 (poor).

Example 1

Non-surface treated carbon fibers ("HT C110" (trade name) manufactured by Toho Tenax Co., Ltd., fiber diameter 9 μm) were cut to a fiber length of 13 mm to obtain chopped fibers.

To a mixer ("MX-C20G" (trade name) manufactured by TOSHIBA CORPORATION) were added 1.0 g of the above carbon fibers, 0.02 g of a random copolymer (A) ("ALKOX CP-B1" (trade name) manufactured by Meisei Chemical Works, Ltd., copolymerization ratio EO:PO:PGE=98:1:1, weight-average molecular weight about 100,000 g/mol, molecular weight distribution about 2.0), 0.08 g of a polyether-based polyurethane resin (B) ("Pulset HA" (trade name) manufactured by Meisei Chemical Works, Ltd., polymerization ratio [bifunctional polyol:hexamethylene diisocyanate]=97.1:2.9) and 500 mL of distilled water. While controlling the voltage at 30 V using a slidac, the mixture in the mixer was stirred for 2 minutes to obtain a slurry carbon fiber dispersion composition.

The resultant carbon fiber dispersion composition was diluted with water (water amount 5000 mL), and papermaking was performed by use of a TAPPI-type square sheet machine (manufactured by YASUDA SEIKI SEISAKUSHO, LTD.) so that the basis weight became 20 g/m².

The carbon fiber dispersion composition after papermaking was dried, and the texture of the resultant carbon fiber sheet was evaluated.

Example 2

A carbon fiber sheet was produced in the same manner as in Example 1, except that the added amount of the random copolymer (A) was changed to 0.05 g, and that the added amount of the polyether-based polyurethane resin (B) was changed to 0.05 g. The texture of the carbon fiber sheet was evaluated.

Example 3

A carbon fiber sheet was produced in the same manner as in Example 1, except that the added amount of the random copolymer (A) was changed to 0.08 g, and that the added amount of the polyether-based polyurethane resin (B) was changed to 0.02 g. The texture of the carbon fiber sheet was evaluated.

Example 4

A carbon fiber sheet was produced in the same manner as in Example 1, except that "ALKOX CP-B2" (trade name) manufactured by Meisei Chemical Works, Ltd. (copolymerization ratio EO:PO:PGE=97:1:2, weight-average molecular weight about 100,000 g/mol, molecular weight distribution about 2.0) was used as the random copolymer (A). The texture of the carbon fiber sheet was evaluated.

Example 5

A carbon fiber sheet was produced in the same manner as in Example 4, except that the added amount of the random copolymer (A) was changed to 0.05 g, and that the added amount of the polyether-based polyurethane resin (B) was changed to 0.05 g. The texture of the carbon fiber sheet was evaluated.

Example 6

A carbon fiber sheet was produced in the same manner as in Example 4, except that the added amount of the random copolymer (A) was changed to 0.02 g, and that the added amount of the polyether-based polyurethane resin (B) was changed to 0.08 g. The texture of the carbon fiber sheet was evaluated.

Example 7

A carbon fiber sheet was produced in the same manner as in Example 2, except that carbon fibers cut to a fiber length of 25 mm were used as the carbon fibers. The texture of the carbon fiber sheet was evaluated.

Example 8

A carbon fiber sheet was produced in the same manner as in Example 5, except that carbon fibers cut to a fiber length of 25 mm were used as the carbon fibers. The texture of the carbon fiber sheet was evaluated.

Comparative Example 1

A carbon fiber sheet was produced in the same manner as in Example 1, except that only 0.1 g of the random copolymer (A) was used. The texture of the carbon fiber sheet was evaluated.

Comparative Example 2

A carbon fiber sheet was produced in the same manner as in Example 1, except that only 0.1 of the polyether-based polyurethane resin (B) was used. The texture of the carbon fiber sheet was evaluated.

Comparative Example 3

A carbon fiber sheet was produced in the same manner as in Example 4, except that only 0.1 g of the random copolymer (A) was used. The texture of the carbon fiber sheet was evaluated.

Comparative Example 4

A carbon fiber sheet was produced in the same manner as in Example 1, except that, in place of the random copolymer (A) and the polyether-based polyurethane resin (B), 0.1 g of "EMULGEN 120" (trade name) (polyoxyethylene lauryl ether, HLB 15.3, cloud point 98° C., viscosity 32.3 mPa·s (50° C.)) manufactured by Kao Corporation was used. The texture of the carbon fiber sheet was evaluated.

Comparative Example 5

A carbon fiber sheet was produced in the same manner as in Example 1, except that, in place of the random copolymer (A) and the polyether-based polyurethane resin (B), 0.1 g of "EMANON 3199V" (trade name) (polyethylene glycol monostearate, HLB 19.4, melting point 56.5 to 61.5° C., viscosity 1,950 mPa·s (70° C.)) manufactured by Kao Corporation was used. The texture of the carbon fiber sheet was evaluated.

Comparative Example 6

A carbon fiber sheet was produced in the same manner as in Example 1, except that, in place of the random copolymer (A) and the polyether-based polyurethane resin (B), 0.1 g of "ALKOX SR" (trade name) (polyethylene oxide) manufactured by Meisei Chemical Works, Ltd. was used. The texture of the carbon fiber sheet was evaluated.

Comparative Example 7

A carbon fiber sheet was produced in the same manner as in Example 2, except that, in place of the random copolymer (A), "ALKOX SR" (trade name) (polyethylene oxide) manufactured by Meisei Chemical Works, Ltd. was used. The texture of the carbon fiber sheet was evaluated.

The evaluation results of the carbon fiber sheets obtained in Examples 1 to 8 and Comparative Examples 1 to 7 are shown in Table 1 below.

carbon fibers were extremely uniformly dispersed in the aqueous media by the dispersants for carbon fibers of the present invention. On the other hand, when only one component of the dispersant for carbon fibers of the present invention was used (Comparative Examples 1 to 3), when a common commercially available dispersant for carbon fibers was used (Comparative Examples 4 and 5), and when polyethylene oxide having no phenylglycidyl ether as a structural unit was used alone or in combination with the polyether-based polyurethane resin (B) (Comparative Examples 6 and 7), it was not possible to produce a carbon fiber sheet in which carbon fibers have been extremely uniformly dispersed.

The invention claimed is:

1. A dispersant, comprising:
   (A) a random copolymer of phenylglycidyl ether and ethylene oxide, or a random copolymer of phenylglycidyl ether, ethylene oxide and propylene oxide; and
   (B) a polyether-based polyurethane resin based on a bifunctional polyol and hexamethylene diisocyanate,
   wherein the bifunctional polyol is polyethylene glycol and/or an ethylene oxide-propylene oxide random copolymer.

2. The dispersant according to claim 1,
   wherein the dispersant comprises 20 to 500 parts by mass of the polyether-based polyurethane resin (B) based on 100 parts by mass of the random copolymer (A).

3. A carbon fiber dispersion composition, comprising:
   the dispersant according to claim 1,
   carbon fibers and
   water.

TABLE 1

|  |  |  | Example | | | | | | | |
| --- | --- | --- | --- | --- | --- | --- | --- | --- | --- | --- |
|  |  |  | 1 | 2 | 3 | 4 | 5 | 6 | 7 | 8 |
| Dispersant | Random copolymer (A) | ALKOX CP-B1 | 0.02 | 0.05 | 0.08 |  |  |  | 0.05 |  |
|  |  | ALKOX CP-B2 |  |  |  | 0.02 | 0.05 | 0.08 |  | 0.05 |
|  | Polyethylene oxide | ALKOX SR |  |  |  |  |  |  |  |  |
|  | Polyether-based polyurethane resin (B) | Pulset HA | 0.08 | 0.05 | 0.02 | 0.08 | 0.05 | 0.02 | 0.05 | 0.05 |
|  | Polyoxyethylene lauryl ether | EMULGEN 120 |  |  |  |  |  |  |  |  |
|  | Polyethylene glycol monostearate | EMANON 3199V |  |  |  |  |  |  |  |  |
| Carbon fiber length |  |  | 13 mm | 13 mm | 13 mm | 13 mm | 13 mm | 13 mm | 25 mm | 25 mm |
| Evaluation of texture |  |  | 7 | 8 | 7 | 6 | 8 | 6 | 7 | 7 |

|  |  |  | Comparative Example | | | | | | |
| --- | --- | --- | --- | --- | --- | --- | --- | --- | --- |
|  |  |  | 1 | 2 | 3 | 4 | 5 | 6 | 7 |
| Dispersant | Random copolymer (A) | ALKOX CP-B1 | 0.1 |  |  |  |  |  |  |
|  |  | ALKOX CP-B2 |  |  | 0.1 |  |  |  |  |
|  | Polyethylene oxide | ALKOX SR |  |  |  |  |  | 0.1 | 0.05 |
|  | Polyether-based polyurethane resin (B) | Pulset HA |  | 0.1 |  |  |  |  | 0.05 |
|  | Polyoxyethylene lauryl ether | EMULGEN 120 |  |  |  | 0.1 |  |  |  |
|  | Polyethylene glycol monostearate | EMANON 3199V |  |  |  |  | 0.1 |  |  |
| Carbon fiber length |  |  | 13 mm | 13 mm | 13 mm | 13 mm | 13 mm | 13 mm | 13 mm |
| Evaluation of texture |  |  | 4 | 5 | 3 | 2 | 1 | 2 | 5 |

As shown in Table 1, when the dispersants for carbon fibers of the present invention were used, it was possible to produce the carbon fiber sheets in which the carbon fibers have been extremely uniformly dispersed even if the carbon fibers were 12.5 mm long or more. This means that the 4. The carbon fiber dispersion composition according to claim 3, comprising:
   2 to 30 parts by mass of the dispersant based on 100 parts by mass of the carbon fibers.

5. A method for manufacturing a carbon fiber sheet, comprising:
papermaking and drying the carbon fiber dispersion composition according to claim 3.

* * * * *